Oct. 25, 1932.  A. DINA  1,884,608
SCREENED AND VENTILATING FIRE SHUTTER
Filed Aug. 31, 1929   2 Sheets-Sheet 1
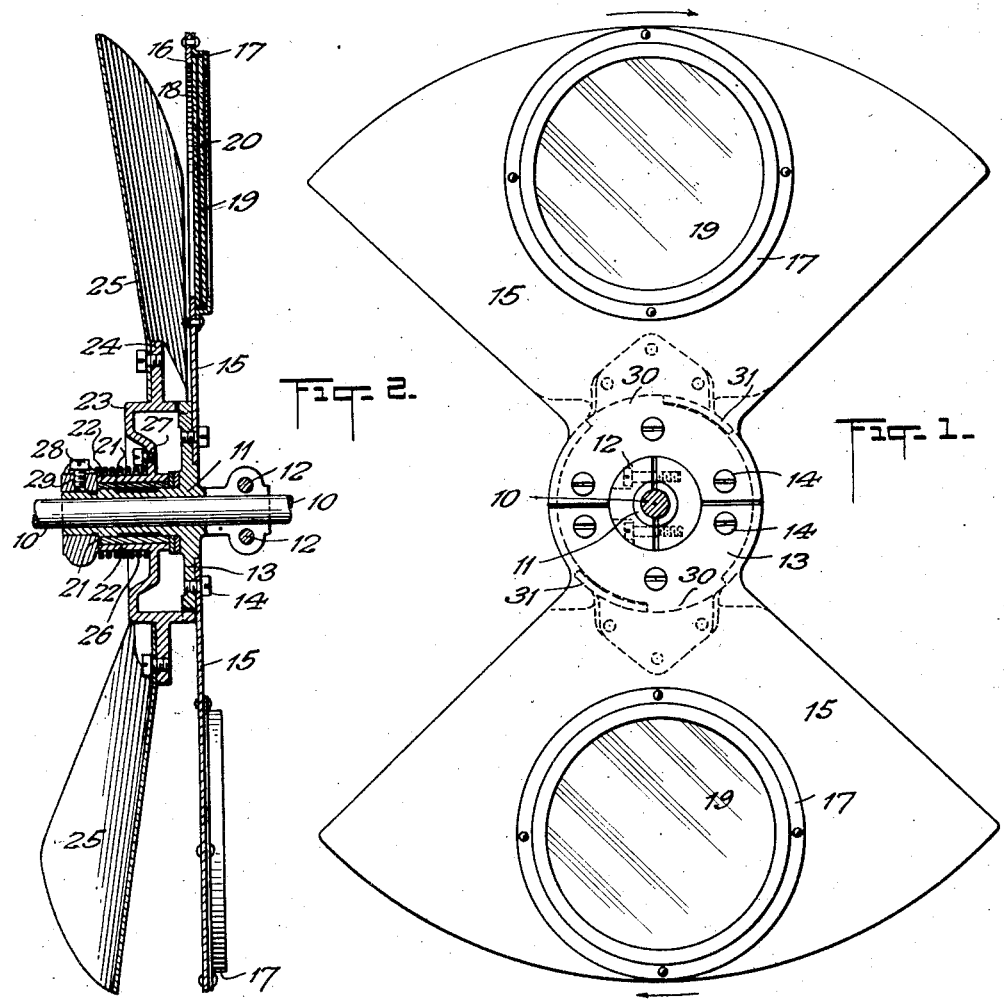
INVENTOR
AUGUSTO DINA
BY
ATTORNEY Oct. 25, 1932.  A. DINA  1,884,608
SCREENED AND VENTILATING FIRE SHUTTER
Filed Aug. 31, 1929  2 Sheets-Sheet 2
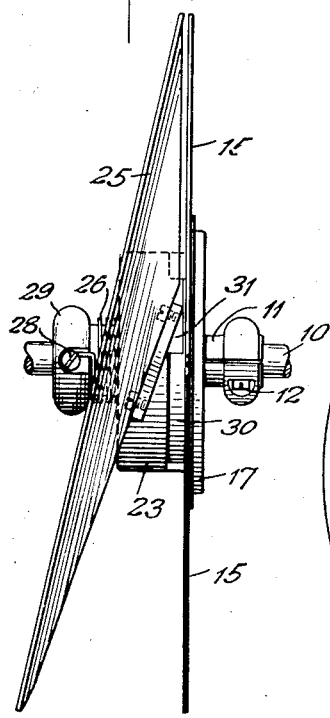
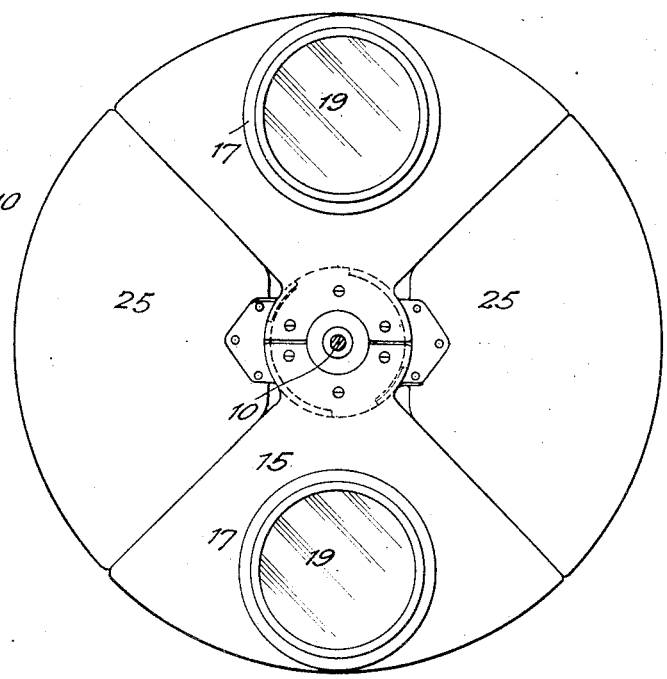
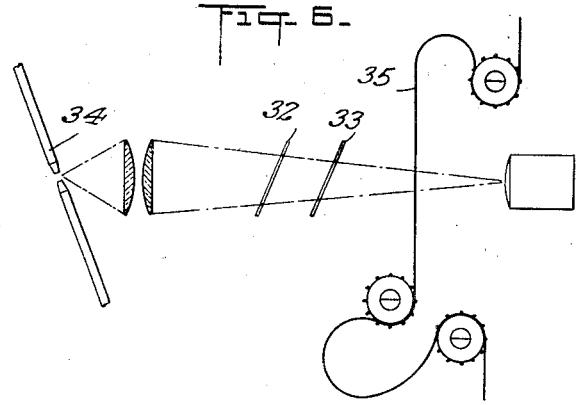
INVENTOR
*AUGUSTA DINA*
BY
*Howard W. Dix*
ATTORNEY Patented Oct. 25, 1932

1,884,608

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

SCREENED AND VENTILATING FIRE SHUTTER

Application filed August 31, 1929. Serial No. 389,838.

This invention relates to motion picture apparatus and particularly to shutters therefor with especial reference to a combined screen and ventilating fire shutter.

One of the main objects of the invention is to provide a simple, compact, durable, and efficient device which, when in operation and running, will act in the usual manner as a motion picture machine shutter, but which, when it is stopped for any reason, is so constructed that its elements will automatically assume positions in which the shutter acts effectively as a fire screen especially when disposed between the source of light and the film, and in which the shutter may also be constructed to permit the projection of still pictures without damage to the film or slide from the heat of the projection light.

Another object of the invention is the provision of a novel fire screen and shutter which is automatic in causing the ventilation for cooling the film and aperture, and is also automatic in changing itself from the fire screen condition to the shutter condition and in changing back to its screen condition and to accomplish these changes with the least power requirement.

Further and more specific objects, features, and advantages will more clearly appear from the detailed description given below when taken in connection with the accompanying drawings which form part of the specification and which illustrate one preferred embodiment of the invention.

Considered broadly, the invention concerns a rotatable shutter, preferably but not necessarily, disposed between the source of the projection light and the film and comprising a plurality of relatively movable blades. These blades in a particular form are arranged in sets of two or three each set constituting a shutter and as such one set is fixed to the shutter shaft to rotate therewith and another set spaced therefrom on the shaft a sufficient distance so that the windage of the one will not affect the other. The second shutter is loosely mounted on the shaft and actuated by a spring which, when the shaft is not rotating, will tend to move the second shutter to a position where its blades will line up in axial registration with openings between the blades of the fixed shutter to form therewith a complete barrier for the projection light and thus the two shutters will then act as a fire shutter or screen especially when they are disposed between the source of light and the film.

Preferably the second and relatively movable shutter has its blades as a whole bent or disposed at an angle to the axis of rotation so as to create a stream of air which may be directed toward the film. When the shutter shaft starts to move, the air resistance on the blades of the movable shutter causes it to move back against the action of the spring to aline itself axially with the blades of the fixed shutter and thus present a plurality of openings through which the projection light may pass to the film and thence to the screen.

In a preferred instance, the fixed shutter blades are one or both provided with light screens therein such as the so-called Gold screens, so that when the shaft is stopped the shutter can be moved to a position where the light can pass through the Gold screens and the machine may be used as a projector of still pictures when desired. In the event the shutter stops so that the projection light is on one of the Gold screens, there is no danger of the film being ignited as very little heat is able to pass through the screen.

A preferred embodiment of the invention is shown in the drawings in which,

Fig. 1 is a front elevation of a preferred form of shutter with the blades in their running alinement;

Fig. 2 is a vertical section taken through the shutter shown in Fig. 1;

Fig. 3 is a cross section of one face of the relatively movable shutters;

Fig. 3a is a detail of one of the shutter stops;

Fig. 4 is a front view of the shutters in their non-alined position when the shaft is still and the blades of the shutters are acting to form a fire screen or shutter;

Fig. 5 is a side elevation of the shutters in the position shown in Fig. 4; and, Fig. 6 is a diagrammatic view of the modified form of the invention in which both of the shutters have their blades angularly bent to act as ventilating means and are more widely spaced apart.

As shown in the drawings, the present preferred form of the invention comprises a shutter shaft 10, to which is fastened a split sleeve-like hub 11 by means of screws 12. This hub has a circular, preferably integrally formed flange 13 to which by means of screws 14, the blades 15 of the first shutter are fastened and arranged on opposite sides of the flange 13. These blades 15 are disposed flat in the plane of rotation and each is apertured as at 16. Around each aperture 16 is a frame 17 and therein are plates of glass 18 and 20 with an intervening layer of material such as 19 allowing light to pass through but absorbing substantial amounts of the heat of the projection beam.

It will be noticed that the blades 15 are in the plane of rotation of the shutter of which they are part, and that therefore no wind wash will result from this part of the device.

As shown in the drawings, a second sleeve 21 is loosely mounted on sleeve 11 and acts as a sort of ring washer. Rotatably mounted on sleeve 21 is sleeve 22 at one end of which is a cup-shaped hub 23 on the outer periphery of which is a flange 24 to which on opposite sides thereof are fastened the blades 25 of the second shutter which blades are shown as bent or disposed as a whole at an angle to the axis of rotation to act as fans to ventilate the film and the projection head of the machine.

Around the sleeve 22 is coiled a spring 26 one end of which is fastened beneath a screw 27 on the hub 23 and the other end of which is fastened beneath a screw 28 on a collar 29 fastened to the shaft 10 at one end of the sleeves 21 and 22 but separate therefrom. This spring has the predetermined tendency to move the blades 25 to the position shown in Fig. 4 when the shutter shaft 10 stops running so that the two shutters act as a fire screen to prevent the access of light to the film from the projection light beam.

However, when the shutter shaft starts rotating, the wind pressure against the bent blades of the movable second shutter such as the blades 25, will cause the shutter to move against the resistance of the spring 26 and assume the alined position shown in Fig. 2 where the light will be able to pass through the thus-formed openings and fall on the film. In this operative running position of the shutter blades as described, it will be noted that the blades 25 will be alined with and cover the corresponding blades 15 of the fixed or first shutter on the shaft 10 so that the opening formed by the Gold screen is covered and the shutter can function just as an ordinary shutter would for the projection of motion pictures. When the shutter shaft 10 stops rotating, however, then the second shutter with its bent blades 25 will move to the position shown in Fig. 4 thus forming a fire screen and also uncovering the Gold screen openings. These openings can then be availed of, for by moving the blades 15 of the first shutter slightly, the screen openings can be brought into alinement with the projection beam if they do not happen to be already in that position and a particular section of the film may be projected as a still picture without danger of fire or injury to the film.

The movable second shutter having the blades 25 mounted on the sleeve 22 have predetermined limits of movement which are defined by means of suitable stops. These stops are formed on the flange 13 and on the inner face of the cup-shaped hub 23. These stops preferably take the form of ears or dogs such as 30 on the outer periphery of the flange 13 and similar dogs 31 on the co-acting edge of the hub 23. These dogs are so angularly related that they will engage in two positions of the blades 25, each position ninety degrees from the other. Thus the two positions of the blades 25 are defined and limited as ninety degrees apart, one position when the blades 25 are back of the blades 15 and the other position when the blades 25 are between the blades 15 and acting to close the gap between the blades 15 and form a complete fire screen. In Fig. 3a it will be noticed that the ends of the ear or dog 31 is provided with rubber cushions such as 31a to cushion the contact between the dog 31 and the other dogs with which it may contact. All the dogs may be provided with these rubber cushions if desired.

It will be observed that since the blades 15 are flat in the plane of the rotation of the shaft 10 that they will cause no disturbing wind wash to affect the movement of the blades 25 of the second shutter which is definitely spaced from the first fixed shutter blades 15.

In the modified form of the invention shown in the Fig. 6 of the drawings, the two shutters shown as 32 and 33 are both provided with blades bent at an angle to the axis of rotation and are spaced further apart to be sure that the air wash from one shutter does not affect the relative movement of the blades of the other. Either one of the shutters can be fixed to the shaft 10 but the other one will be relatively movable in a manner similar to the one just described so that although the shutters are spaced apart they will function as fire screens when stopped and will act otherwise normally when in motion. In the diagram it is seen that the shutters are spaced apart and located in the beam between the source of light 34 and the film 35. Since they are in a tapering beam of light is is merely a matter of design to see that they are of sufficient length to properly cover that part of the beam in which they lie.

While the invention has been described in detail and with respect to a present preferred form thereof, it is not to be limited to such details and forms since many changes and modifications may be made and the invention embodied in other forms without departing from the spirit and scope of the invention in its broader aspects. Hence it is desired to cover all forms and modifications which may come within the language and scope of any one or more of the appended claims.

What is claimed, is,

1. A shutter for motion picture machines which comprises a first shutter with blades fixed to the shutter shaft, a second shutter having blades rotatable with the shaft but movable with respect to the blades of the first shutter, the blades of both shutters being bent at an angle to the axis of rotation, said sets of blades being spaced far enough apart to prevent the air wash of one from affecting the action of the other.

2. A shutter for motion picture machines which comprises a first shutter having blades with openings therein, a light transmitting and heat absorbing screen in said openings, a second shutter spaced from the first shutter but associated therewith and also having blades, the two shutters being spaced far enough apart to prevent the air wash of one being effective to disturb the action of the other, the blades of both shutters being bent at an angle to the axis of rotation to ventilate the film and the projection head, means permitting the blades of the second shutter to cover the blades of the first shutter when the shutter shaft is running and said means also permitting the blades of the second shutter to assume a position whereby they will be alined with the spaces between the blades of the first shutter when the shutter shaft stops running whereby the blades of the two shutters will thus act as a fire screen when the film stops moving, the screen opening in the blades of the first shutter then permitting the transmission of still pictures.

3. A shutter device for motion picture machines which comprises a first shutter having blades with openings therein, a light transmitting and heat absorbing screen in said openings, a second shutter spaced from the first shutter but associated therewith, spring means connecting the shutters to maintain the blades of one in alignment with the openings between the blades of the other to form a fire shutter when the shutter shaft speed is below a definite value, the blades of the second shutter, as a whole being bent or disposed at an angle to the plane of rotation, the angular disposition during rotation causing the said blades to act as a fan and moving them into alignment with the blades of the first shutter in normal running operation due to the wind resistance there-against.

4. A shutter for motion picture machines which comprises a first shutter having a plurality of blades, a shaft on which said first shutter is fastened, a second shutter having a plurality of blades and movable on the shaft, said second shutter spaced sufficiently away from the first shutter to prevent the air wash of one from affecting the blades of the other, spring means connecting the shutters to maintain the blades of one in alignment with the openings between the blades of the other to form a fire shutter when the shutter shaft speed is below a definite value, the blades of at least one of said shutters being inclined as a whole to the plane of rotation to produce a fan action.

5. A shutter for motion picture machines which comprises a first shutter element having blades with openings therein, a light transmitting and heat absorbing screen in said openings, a second shutter element spaced apart from the first shutter element but associated therewith, spring means connecting the shutters to maintain the blades of one in alignment with the openings between the blades of the other to form a fire shutter when the shutter shaft speed is below a definite value, the blades of the second shutter element as a whole being disposed at an angle to the plane of rotation, said angular disposition causing a fan action and tending to move the shutter blades thereof in alignment with the blades of the first shutter during normal running operation, said first shutter blades being disposed flat of the plane of rotation.

6. A shutter for motion picture machines which comprises a first shutter element having blades with openings therein, a light transmitting and heat absorbing screen in said opening, a second shutter spaced from the first shutter but associated therewith, the two shutters being spaced apart sufficiently to prevent the air wash of one being effective to disturb the action of the other, spring means connecting the shutters to maintain the blades of one in alignment with the openings between the blades of the other to form a fire shutter when the shutter shaft speed is below a definite value, the blades of at least one of said shutters being inclined as a whole to the plane of rotation to produce a fan action.

7. A shutter for motion picture machines which comprises a first shutter element having blades and fastened to a rotatable shaft, a second shutter element having blades and movable on the shaft angularly, the two shutters spaced far enough apart to prevent the air wash of one from affecting the action of the other, spring means connecting the shutters to maintain the blades of one in alignment with the openings between the blades of the other to form a fire shutter when the shutter shaft speed is below a definite value, the first shutter element having its blades disposed in the plane of rotation, and the second shutter having its blades disposed as a whole at an angle to the plane of rotation, this angular disposition causing a fan action and tending to move the blades of the second shutter in alignment with the blades of the first shutter during normal running operation, due to the wind resistance there-against.

8. A shutter for motion picture machines which comprises a first shutter having blades fixed to a shaft and lying flat of the plane of rotation, a second shutter having blades spaced from the blades of the first shutter but associated therewith, the blades of the second shutter being movable with the shaft but relatively movable with respect to the blades of the first shutter, the blades of the second shutter being bent or disposed as a whole, at an angle to the plane of rotation, spring means connecting the shutters to maintain the blades of one in alignment with the openings between the blades of the other to form a fire shutter when the shutter shaft speed is below a definite value, the angular disposition of the blades of the second shutter causing a fan action during running operation and tending to move the blades thereof in alignment with the blades of the first shutter due to wind resistance there-against and against action of said spring.

In testimony whereof I have hereunto set my hand.

AUGUSTO DINA.